(12) United States Patent
Kohn et al.

(10) Patent No.: US 9,611,047 B2
(45) Date of Patent: Apr. 4, 2017

(54) ARRANGEMENT FOR A TANK BETWEEN A NACELLE COWLING AND A TURBOMACHINE

(71) Applicant: SNECMA, Paris (FR)

(72) Inventors: Thierry Kohn, Les Pavillons Sous Bois (FR); Jeremy Edmond Fert, Paris (FR)

(73) Assignee: SNECMA, Paris (FR)

( * ) Notice: Subject to any disclaimer, the term of this patent is extended or adjusted under 35 U.S.C. 154(b) by 260 days.

(21) Appl. No.: 14/479,820

(22) Filed: Sep. 8, 2014

(65) Prior Publication Data

US 2015/0075132 A1 Mar. 19, 2015

(30) Foreign Application Priority Data

Sep. 13, 2013 (FR) ...................................... 13 58823

(51) Int. Cl.
| | | |
|---|---|---|
| B64D 29/00 | (2006.01) | |
| B64D 47/00 | (2006.01) | |
| F02C 7/06 | (2006.01) | |
| B64D 29/08 | (2006.01) | |
| B64D 33/00 | (2006.01) | |
| F02C 7/32 | (2006.01) | |
| F16N 19/00 | (2006.01) | |

(52) U.S. Cl.
CPC ............. B64D 29/00 (2013.01); B64D 29/08 (2013.01); B64D 33/00 (2013.01); B64D 47/00 (2013.01); F02C 7/06 (2013.01); F02C 7/32 (2013.01); F16N 19/00 (2013.01)

(58) Field of Classification Search
CPC ........ B64D 29/00; B64D 29/08; B64D 33/00; B64D 47/00; F16N 19/00; F16N 19/003

USPC ......................................... 60/39, 8; 244/53 R
See application file for complete search history.

(56) References Cited

U.S. PATENT DOCUMENTS

| | | | | |
|---|---|---|---|---|
| 1,933,998 | A | * 11/1933 | Payne | .................... B64D 33/10 |
| | | | | 123/196 AB |
| 4,673,360 | A | 6/1987 | Kojima | |
| 5,249,417 | A | * 10/1993 | Duesler | ................. F01D 25/285 |
| | | | | 248/596 |
| 5,610,341 | A | * 3/1997 | Tortora | ................... F01D 17/02 |
| | | | | 73/756 |

(Continued)

FOREIGN PATENT DOCUMENTS

FR 2 855 497 A1 12/2004

OTHER PUBLICATIONS

French Preliminary Search Report issued Apr. 30, 2014, in French Application No. 13 58823 filed Sep. 13, 2013 (with English Translation of Categories of Cited Documents).

(Continued)

*Primary Examiner* — Steven Sutherland
(74) *Attorney, Agent, or Firm* — Oblon, McClelland, Maier & Neustadt, L.L.P.

(57) ABSTRACT

An arrangement of a tank of lubrication liquid for an aircraft turbomachine, under a nacelle cowling covering the turbomachine, is provided. The tank is arranged in the volume located between the turbomachine and the nacelle cowling. The nacelle cowling includes an opening for access to the volume. The tank is fastened to an internal face of a panel closing off the opening. The unit formed by the panel and the tank is added onto the nacelle cowling and is able to be mounted and dismounted from the nacelle cowling.

9 Claims, 2 Drawing Sheets

(56) References Cited

U.S. PATENT DOCUMENTS 6,039,287 A * 3/2000 Liston .................... B64D 29/00
                                                                                               244/120
7,090,165 B2 * 8/2006 Jones .................... B64D 29/08
                                                                                               244/53 R

OTHER PUBLICATIONS

U.S. Appl. No. 14/576,694, filed Dec. 19, 2014, Fert, et al.

* cited by examiner

ARRANGEMENT FOR A TANK BETWEEN A NACELLE COWLING AND A TURBOMACHINE

TECHNICAL FIELD

The invention relates to an arrangement for the mounting of an oil tank of a turbomachine between the external cowling of the nacelle and the intermediate casing, which defines the external portion of the turbomachine.

The invention relates more particularly to the mounting of an oil tank at a distance from the pump of the lubrication system, as such making it possible to optimise the space dedicated to this tank, and limiting the problems relating to the interface and to the mechanical connection of the tank with the turbomachine.

PRIOR ART

A conventional turbomachine comprises, among other components, a gear box, commonly referred to as "accessory gear box" (AGB), which drives other components of the turbomachine by taking energy from the turbomachine.

The lubrication circuit of the turbomachine comprises a hydraulic pump driven by the gear box and a tank of lubrication liquid which is commonly mounted in the vicinity of the gear box, in a zone referred to as "compartment FAN" located between the secondary flow and the cowling of the nacelle.

When the gear box is of reduced dimensions, the tank of liquid is generally integrated in the casing of the gear box.

However, when the gear box is of larger dimensions, in particular for the driving of a large number of pieces of equipment of the turbomachine, it is not possible to integrate the tank of liquid in the gear box. The tank of liquid is then mounted on the casings of the turbomachine, which then have to be modified so that they integrate the fastenings of the tank.

The mounting of the tank of liquid on a casing of the turbomachine is carried out by the intermediary of means for mounting, which are themselves assembled on the casing. There is therefore an accumulation in the number of components of the turbomachine.

Also, operating clearances must be present between the tank and the casing, the nacelle cowling and other components of the turbomachine which are arranged in the vicinity.

Due to the volume of the tank and of these clearances, the shape of the nacelle may have to be modified. An increase in the main frame of the nacelle is thus obtained and consequently an increase in the drag of the mass.

Also, an access to the tank of lubrication liquid needs to be arranged through the nacelle cowling, in order in particular to fill the tank with a lubrication liquid, to visually check the level of the lubrication liquid, or to intervene on a sensor for measuring the oil level.

To this effect, according to a known embodiment, the nacelle cowling comprises an opening, through which an operator can access the tank of liquid. This opening is closed by a trapdoor mounted articulated on the nacelle cowling by the intermediary of hinges.

However, the trapdoor used is relatively massive, as it has to be able to be manipulated frequently, and the system of articulation used, which generally comprises support elements arched as a "gooseneck" has a certain encumbrance.

The invention has for purpose to propose an arrangement for the mounting of the tank of lubrication liquid that makes it possible to reduce the space dedicated to the tank of liquid in the space located between the intermediate casing of the turbomachine and the nacelle cowling.

DESCRIPTION OF THE INVENTION

The invention proposes an arrangement for a tank of lubrication liquid of an aircraft turbomachine, under a nacelle cowling covering said turbomachine, with the tank being arranged in the volume located between the turbomachine and the nacelle cowling, with the nacelle cowling comprising an opening for access to said volume, characterised in that the tank is fastened to an internal face of a panel that closes off said opening, with the unit formed by the panel and the tank being added onto the nacelle cowling and able to be mounted and dismounted from the nacelle cowling.

Such a mounting of the tank directly onto an internal face of the panel, which is fastened with the rest of the nacelle cowling, forms a unit of reduced dimensions which requires a limited space between the intermediate casing and the nacelle cowling.

Preferably, the tank is fastened onto the internal face of the panel before the fastening of the panel onto the nacelle cowling.

Preferably, the tank and the panel are carried out in a single part.

Preferably, the panel forms a wall of the tank.

Preferably, the panel comprises an opening that makes it possible to access an orifice for filling the tank.

Preferably, the tank comprises a wall which is attached to the internal face of the panel.

Preferably, said wall of the tank comprises a device for visually checking the oil level in the tank and the panel comprises an opening located facing said device for visually checking.

Preferably, the tank comprises an electronic sensor for measuring the oil level and an electrical connector for connecting the sensor to an electronic device for managing the turbomachine, said connector being located at a distance from the sensor.

Preferably, the turbomachine is of a main horizontal axis and the nacelle cowling comprises an upper portion and a lower portion, the tank and the panel are fastened to the upper portion of the nacelle cowling.

Preferably, the tank comprises an oil outlet connector and an oil return connector of the self-closing type.

BRIEF DESCRIPTION OF THE DRAWINGS

Other characteristics and advantages of the invention shall appear when reading the following detailed description for the understanding of which reference will be made to the annexed figures among which.

DETAILED DESCRIPTION OF PARTICULAR EMBODIMENTS

Figure 1:
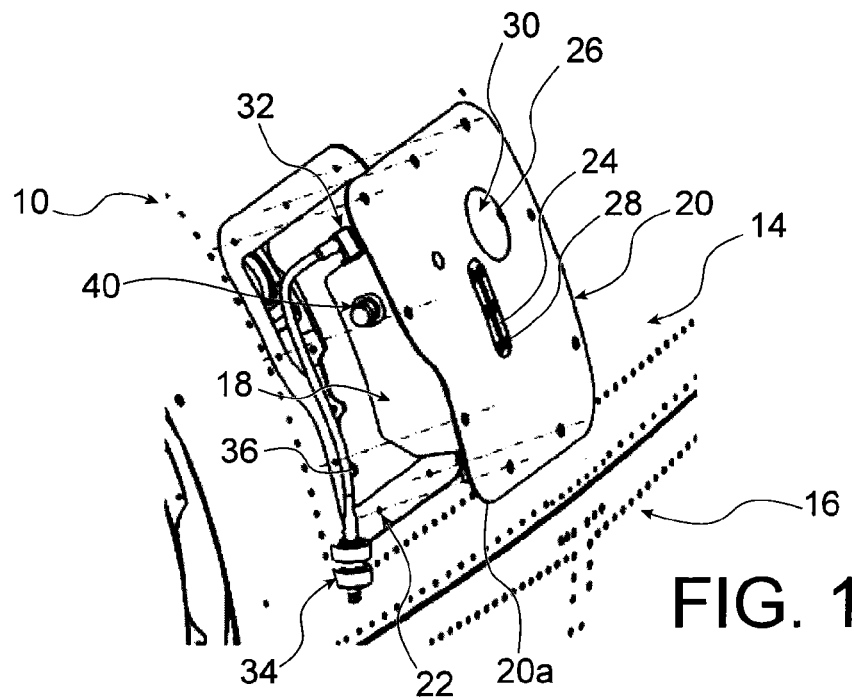
FIG. 1 is a diagrammatical representation in perspective of the assembly of the tank of lubrication liquid on the panel according to the invention, showing the assembly before it is fastened onto the nacelle cowling.
Figure 3:
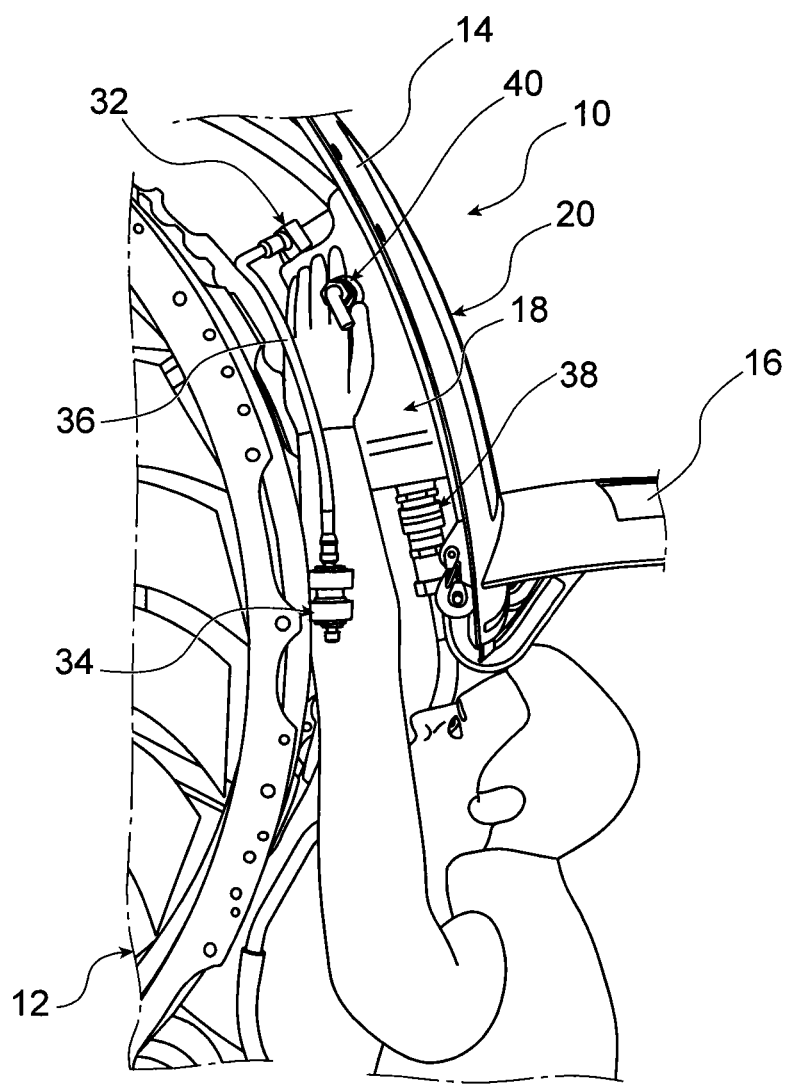
FIG. 3 is a view of an end of the nacelle receiving the turbomachine, showing the position of the tank of lubrication liquid in relation to the nacelle cowling.

FIG. 1 shows a portion of a nacelle cowling 10 wherein an aircraft turbomachine 12, shown in FIG. 3, is mounted.

The nacelle cowling 10 has a generally annular shape and is coaxial to the turbomachine 12.

As can be seen in FIG. 3, the nacelle cowling 10 is divided into two portions, an upper portion 14 and a lower portion 16.

The lubrication system of the turbomachine 12 comprises a tank of lubrication liquid 18, which shall be referred to in what follows as tank, which is mounted in the annular space which is located between the turbomachine 12 and the nacelle cowling 10.

According to the invention, the tank 18 is fastened to the nacelle cowling 10, and it is fastened to a panel 20 of the upper portion 14 of the nacelle cowling 10.

This panel 20 closes off an opening 22 formed in the upper portion 14 of the nacelle cowling 10, through which said opening 22 the tank 18 is mounted in the annular space defined hereinabove.

Figure 2:
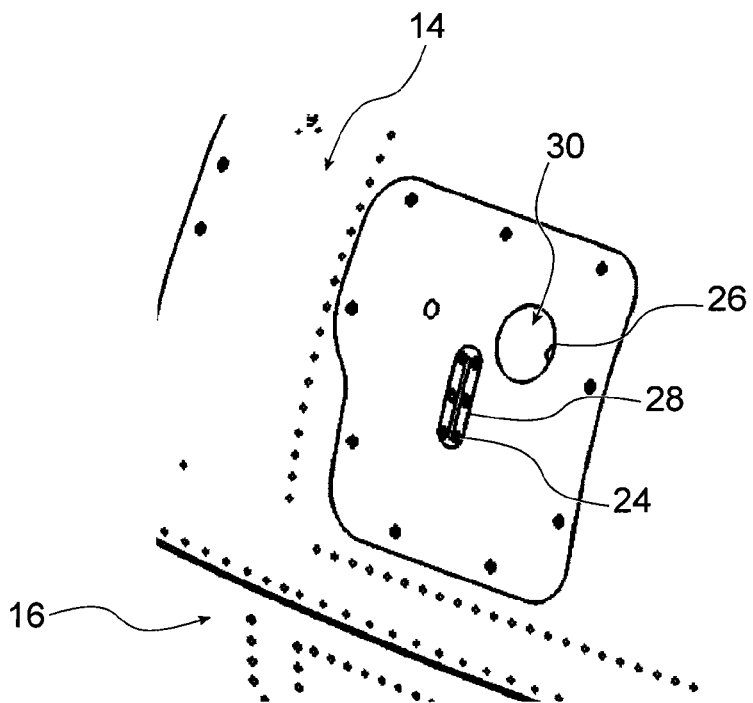
FIG. 2 is a diagrammatical representation similar to that of FIG. 1, showing the assembly fastened onto the nacelle cowling.

When it is mounted on the upper portion 14 of the nacelle cowling 10, as can be seen in FIG. 2, the panel 20 entirely closes off the opening 22 and it is flush with the external wall of the nacelle cowling 10. The panel 20 thus does not produce any aerodynamic disturbances.

The tank 18 is fastened to an internal face 20a of the panel 20.

According to a first embodiment of the invention, the tank 18 comprises a wall (not shown) which is placed side by side against the internal face 20a of the panel 20, with the tank 18 fastened to the internal face 20a of the panel 20 by any conventional means, for example by gluing.

According to a second embodiment, the tank 18 and the panel 20 form an element of a single block, they are thus carried out as a single part.

According to a third embodiment, the panel 20 constitutes a wall of the tank 18.

This makes it possible to suppress a space which may not be used between the tank 18 and the panel 20. This also makes it possible to easily transfer heat between the lubrication liquid contained in the tank 18 and the exterior of the panel 20, in order to cool it effectively.

Indeed, when the turbomachine 12 is an aircraft turbomachine, the panel 20 is in contact with air of which the temperature is about −50° C. The panel 20 as such forms a surface cooling device. Furthermore, this method of cooling is passive and does not require any supply of energy.

The tank 18 and the panel 20 form a unit which is added onto the nacelle cowling 10. The means for fastening the panel 20 with the nacelle cowling 10, i.e. the means for fastening this unit onto the nacelle cowling 10 are removable means, making it possible to mount and dismount this sub-unit with the nacelle cowling 10 at any time, identically to the mounting and dismounting of any other portion of the nacelle cowling 10, in order to allow for an intervention on the turbomachine.

The tank 18 comprises an orifice in order to fill it and a gauge 24 for the visual reading of the level of the liquid in the tank 18.

In order to facilitate the access of a technician to these elements of the tank 18, the panel 20 comprises an opening 26 associated to the orifice for filling and an opening 28 associated to the gauge 24 for visually checking the level of liquid 24.

The opening 26 associated to the orifice for filling is closed off by a mobile flap 30, allowing for the filling of the tank 18 directly from the outside. It is as such easier for the technician to perform the filling operations of the tank 18 as there is only the mobile flap to be removed in order to access the filling orifice.

The opening 28 associated to the gauge 24 for visually checking is located directly facing the gauge 24 for visually checking. As such, visually checking the level of liquid in the tank 18 can be carried out directly from the outside, without any intervention from a technician.

In the embodiment according to which the tank 18 is a separate part of the panel 20, the tank 18 is fastened to the panel 20 before the mounting of the panel 20 onto the upper portion 14 of the nacelle cowling 10. This makes it possible to facilitate the mounting of the tank 18 onto the panel 20 as the access to these two elements is relatively easy.

In addition, the mounting of the unit formed by the tank 18 and the panel 20 on the upper portion 14 of the nacelle cowling 10 is carried out by inserting the tank through the opening 22 made in the upper portion 14 of the nacelle cowling 10, and by positioning the panel 20 in relation to the upper portion 14 of the nacelle cowling 10.

Then, the panel 20 is fastened to the upper portion 14 of the nacelle cowling 10 by conventional means for fastening, for example by screws of which the head of the screws is flush with the external surface of the nacelle cowling 10.

The tank 18 also comprises an electronic sensor 32 for measuring the level of the lubrication liquid inside the tank 18. This sensor 32 is here shown on an upper portion of the tank 18.

As can be seen in FIG. 3, the arrangement of the tank 18 in relation to the nacelle cowling 10 and the position of the sensor 32 in relation to the tank 18 render direct access to the sensor 32 difficult, and even impossible for a technician.

Also, the electrical connection of the sensor 32 can be carried out only after the mounting of the tank 18 and of the panel 20, and only from the lower portion 16 of the nacelle cowling 10.

According to an alternative not shown, the sensor 32 is mounted on a lower portion of the tank 18. This position makes it possible to facilitate the access of a technician to the sensor 32.

The tank 18 then comprises a self-closing device that makes it possible to close off the mounting opening of the sensor 32 when the sensor is dismounted from the tank 18.

In order to allow for its electrical connection, the sensor 32 can comprise a connector 34 located at a distance from the sensor 32 and connected to the rest of the sensor 32 by a connection cable 36.

The connection cable 36 is flexible and its length is defined so that the connector 34 is located at a position that is easy to access for a technician. This connection cable 36, also called a harness, is furthermore fastened at certain locations to a fixed portion of the nacelle cowling 10, so that it remains immobile when the turbomachine (12) is operating.

The tank 18 further comprises an oil outlet connector 38 through which the oil contained in the tank 18 exits the tank 18 in order to supply components of the turbomachine, and an oil return connector 40 through which the oil returns to the tank 18.

These two connectors 38, 40 are easy to access for a technician and they allow for the connecting and the disconnecting of ducts of the oil circuit with the tank 18.

Preferably, the connectors 38, 40 are of the type called "quick-disconnect" i.e. they are of the self-closing type, which allows for the locking of the oil circuit at the same time as their disconnection.

As such, when these connectors 38, 40 are disconnected by the operator prior to the dismounting of the unit formed by the panel 20 and the tank 18, the connectors 38, 40 for the return and the outlet of oil are closed automatically in order to prevent the oil from escaping from the tank 18.

The invention claimed is:

1. An arrangement of a tank of lubrication liquid of an aircraft turbomachine, under a nacelle cowling covering said aircraft turbomachine, with the tank being arranged in a volume located between the aircraft turbomachine and the nacelle cowling, with the nacelle cowling comprising an opening for access to said volume,
wherein the tank is fastened to an internal face of a panel that closes off said opening (22), with a unit formed by the panel and the tank being added onto the nacelle cowling and able to be mounted and dismounted from the nacelle cowling.

2. The arrangement as claimed in claim 1, wherein the tank and the panel are made of a single part.

3. The arrangement as claimed in claim 1, wherein the panel forms a wall of the tank.

4. The arrangement as claimed in claim 1, wherein the panel comprises an opening which provides access an orifice for filling the tank.

5. The arrangement as claimed in claim 1, wherein the tank comprises a wall which is attached to the internal face of the panel.

6. The arrangement as claimed in claim 5, wherein said wall of the tank comprises a device for visually checking an oil level in the tank and the panel comprises an opening located facing said device for visually checking.

7. The arrangement as claimed in claim 1, wherein the tank comprises an electronic sensor for measuring an oil level and an electrical connector for connecting the electronic sensor to an electronic device for managing the aircraft turbomachine, said electrical connector being located at a distance from the electronic sensor.

8. The arrangement as claimed in claim 1, wherein the aircraft turbomachine is of a main horizontal axis and the nacelle cowling comprises an upper portion and a lower portion, wherein the tank and the panel are fastened to the upper portion of the nacelle cowling.

9. The arrangement as claimed in claim 1, wherein the tank comprises an oil outlet connector and an oil return connector of a self-closing type.

\* \* \* \* \*